(12) United States Patent
Ozbek (10) Patent No.: US 6,446,008 B1
(45) Date of Patent: Sep. 3, 2002

(54) ADAPTIVE SEISMIC NOISE AND INTERFERENCE ATTENUATION METHOD

(75) Inventor: Ali Ozbek, Milton (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/700,440

(22) PCT Filed: May 18, 1999

(86) PCT No.: PCT/GB99/01582

§ 371 (c)(1),
(2), (4) Date: Dec. 7, 2000

(87) PCT Pub. No.: WO99/60423

PCT Pub. Date: Nov. 25, 1999

(30) Foreign Application Priority Data

May 20, 1998 (GB) .............................................. 9810708

(51) Int. Cl.$^7$ ................................................. G01V 1/36
(52) U.S. Cl. ............................................ 702/17; 367/45
(58) Field of Search .............................. 702/17; 367/43, 367/45

(56) References Cited

U.S. PATENT DOCUMENTS

| | | |
|---|---|---|
| 4,556,962 A | 12/1985 | Widrow |
| 4,821,241 A | 4/1989 | Berglund |
| 4,890,264 A | 12/1989 | Crews et al. |
| 4,955,012 A | 9/1990 | Bledsoe et al. |
| 5,138,583 A | 8/1992 | Wason et al. |
| 5,237,538 A | 8/1993 | Linville, Jr. et al. |
| 5,251,183 A | 10/1993 | McConnell et al. |
| 5,365,492 A | 11/1994 | Dragoset, Jr. |
| 5,392,213 A | 2/1995 | Houston et al. |
| 5,448,531 A | 9/1995 | Dragoset, Jr. |
| 5,555,530 A | 9/1996 | Meehan |
| 5,572,483 A | 11/1996 | Chambers et al. |
| 5,933,790 A | 8/1999 | Jeffryes |

FOREIGN PATENT DOCUMENTS

| | | |
|---|---|---|
| GB | 2 273 358 A | 6/1994 |
| GB | 2 309 082 A | 7/1997 |
| WO | 96/09562 | 3/1996 |
| WO | 97/25632 | 7/1997 |

OTHER PUBLICATIONS

R. Ansari and A. E. çetin, Two Dimensional FIR Filters, The Circuits and Filters Handbook, W. K. Chen, ed., IEEE and CRC Press, 1995, pp. 2732–2761.

A. Booker and C.–Y. Ong, Multiple–constraint Adaptive Filtering, Geophysics, vol. 36, No. 3, Jun. 1971, pp. 498–509.

(List continued on next page.)

Primary Examiner—Donald E. McElheny, Jr.
(74) Attorney, Agent, or Firm—William L. Wang; William B. Batzer; John J. Ryberg (57) ABSTRACT

A method relating to filtering coherent noise and interference from seismic data by constrained adaptive beamforming is described using a constraint design methodology which allows the imposition of an arbitrary predesigned quiescent response on the beamformer. The method also makes sure that the beamformer response in selected regions of the frequency-wavenumber space is entirely controlled by this quiescent response, hence ensuring signal preservation and robustness to perturbations. Built-in regularization brings an additional degree of robustness. Seismic signals with arbitrary spectral content in the frequency-wavenumber domain are preserved, while coherent noise and interference that is temporarily and spatially nonstationary is adaptively filtered. The approach is applicable to attenuation of all types of coherent noise in seismic data including swell-noise, bulge-wave noise, ground-roll, air wave, seismic vessel and rig interference, etc. It is applicable to both linear and a real arrays.

23 Claims, 7 Drawing Sheets

OTHER PUBLICATIONS

K. M. Buckley, Spatial/Spectral Filtering with Linearly Constrained Minimum Variance Beamformers, IEEE Trans. Acoust. Speech Signal Processing, vol. ASSP–35, No. 3, Mar. 1987, pp. 249–266.

D. E. Dudgeon and R. M. Mersereau, Multidimensional Digital Signal Processing Chapter 3: Design and Implementation of Two–Dimensional FIR Filters, Prentice–Hall, 1984, pp. 112–161.

O.L. Frost III, An Algorithm for Linearly Constrained Adaptive Array Processing Proceedings of the IEEE, vol. 60, No. 8, Aug. 1972, pp. 926–935.

L. J. Griffiths and C. W. Jim, An Alternative Approach to Linearly Constrained Adaptive Beamforming, IEEE Trans. on Antennas and Propagation, vol. AP–30, No. 1, Jan. 1982, pp. 27–34.

L. J. Griffiths and K. M. Buckley, Quiescent Pattern Control in Linearly Constrained Adaptive Arrays, IEEE Trans. Acoust. Speech Signal Processing, vol. ASSP–35, No. 7, Jul. 1987, pp. 917–926.

S. Haykin, Adaptive Filter Theory, $3^{rd}$ Edition Prentice–Hall, 1996, pp. 1–989.

M. L. Honig and D. G. Messerschmitt, Adaptive Filters: Structures, Algorithms and Applications, Kluwer, Boston, Mass., 1984, pp. 1–337.

H. Hotelling, Analysis of a Complex of Statistical Variables into Principal Components, J. Educational Psychology, vol. 24, 1933, pp. 417–441 and 498–520.

D. H. Johnson and D. E. Dudgeon, Array Signal Processing: Concepts and Techniques, Prentice–Hall, 1993, pp. 393–402.

K. Karhunen, Über Lineare Methoden in der Wahrscheinlichkeitsrechnung, Ann. Acad. Sci. Fennicae, Ser. A.I. Match. Phys., vol. 37, 1947.

E. J. Kelly, Jr. and M. J. Levin, Signal Parameter Estimation for Seismometer Arrays, Mass. Inst. Tech., Lincoln Lab., Tech. Report 339, Jan. 1964, pp. 1–47.

J. S. Lim, Two–Dimensional Signal and Image Processing Chapter 4: Finite Impulse Response Filters, Prentice–Hall, 1990, pp. 195–263.

A. F. Linville and R. A. Meek, A Procedure for Optimally Removing Localized Coherent Noise, Geophysics, vol. 60, No. 1, Jan.–Feb. 1995, pp. 191–203.

M. Lòve, Sur les Fonctions Aléatoires Stationnnaires de Second Ordre, Rev. Sci., vol. 83, 1945, pp. 297–303.

N. L. Owsley, A Recent Trend in Adaptive Spatial Processing for Sensor Arrays: Constrained Adaption, Signal Processing, L. J. Griffiths et al., ed., Academic Press, 1973, pp. 591–604.

R. L. Sengbush, Seismic Exploration Methods Chapter 4: Analysis and Suppression of Seismic Noise, IHRDC, Boston, 1983, pp. 43–88.

M. J. T. Smith and T. P. Barnwell III, Exact Reconstruction Techniques for Tree–structured Subband Coders, IEEE Trans. Acoust. Speech Signal Processing, vol. ASSP–34, No. 3, Jun. 1986, pp. 434–441.

C.–Y. Tseng, Minimum Variance Beamforming with Phase–Independent Derivative Constraints, IEEE Trans. on Antennas and Propagation, vol. 40, No. 3, Mar. 1992, pp. 285–294.

C.–Y. Tseng and L. J. Griffiths, A Unified Approach to the Design of Linear Constraints in Minimum Variance Adaptive Beamformers, IEEE Trans. on Antennas and Propagation, vol. 40, No. 12, Dec. 1992, pp. 1533–1542.

P. P. Vaidyanathan, Multirate Systems and Filter Banks, Prentice–Hall, 1993, pp. 1–911.

B. D. Van Veen, Optimization of Quiescent Response in Partially Adaptive Beamformers, IEEE Trans. on Acoustics, Speech and Signal Processing, vol. 38, No. 3, Mar. 1990, pp. 471–477.

B. D. Van Veen and K. M. Buckley, Beamforming: A Versatile Approach to Spatial Filtering, IEEE ASSP Magazine, Apr. 1988, pp. 4–24.

O. J. O. Vermeer, Seismic Wavefield Sampling, Society of Exploration Geophysicists, 1990, pp. 1–120.

B. Widrow and M. E. Hoff, Jr., Adaptive Switching Circuits, IRE WESCON Conv. Rec., Pt. 4, 1960, pp. 96–104.

B. Widrow, J. R. Glover, Jr., J. M. McCool, J. Kaunitz, C. S. Williams, R. H. Hearn, J. R. Zeidler, E. Dong, Jr., and R. C. Goodlin, Adaptive Noise Cancelling: Principles and Applications, Proc. IEEE, vol. 63, No. 12, Dec. 1975, pp. 1692–1716.

B. Widrow and S. D. Stearns, Adaptive Signal Processing, Prentice–Hall, 1985, pp. 1–474.

H. Yang and M. A. Ingram, Design of Partially Adaptive Arrays Using the Singular Value Decomposition, IEEE Trans. on Antennas and Propagation, vol. 45, No. 5, May 1997, pp. 843–850.

O. Yilmaz, Seismic Data Processing, Soc. of Exploration Geophysicists, XP–002113434, 1987, pp. 69–79.

W. S. Youn and C. K. Un, Fast Adaptive Beamforming Robust to Array Imperfections, Signal Processing, vol. 34, No. 1, Oct. 1993, pp. 109–121.

ADAPTIVE SEISMIC NOISE AND INTERFERENCE ATTENUATION METHOD

This invention relates to seismic data acquisition and to methods of processing seismic data. It relates to a process for filtering coherent noise and interference from seismic data by an adaptive beamforming method. In another aspect, it relates to adaptively filtering coherent noise and interference from seismic data while preserving seismic signals with arbitrary spectral content in the frequency-wavenumber domain. In yet another aspect, it relates to adaptively filtering coherent noise and interference that is temporally and spatially nonstationary. In a further aspect, it relates to adaptively filtering coherent noise and interference that has been recorded by a sensor array in the presence of perturbations.

BACKGROUND OF THE INVENTION

In seismic surveys, a seismic source induces seismic waves at or near the surface of the earth. Explosives, vibrating devices and airguns are examples of seismic sources. These waves propagate through the earth and are reflected, refracted, and diffracted by formations within the earth, and can be detected by a plurality of sensors (typically geophones or hydrophones) at the earth's surface. Each such receiver monitors the seismic wavefield, which is then recorded. The data received by a receiver and then recorded are collectively called a trace. The collection of traces are stored for further processing to gain information about the earth's subsurface. Such information is commonly interpreted to detect the possible presence of hydrocarbons, or to monitor changes in hydrocarbon bearing rocks.

Seismic data in general contains coherent noise signals, along with seismic reflection signals. These noise signals, hereafter referred to as the noise, interfere with the interpretation of the seismic signals, and degrade the quality of the subsurface images that can be obtained by further processing. It is therefore desirable to suppress the noise that is present in the recorded data before processing it for imaging.

In land seismics, source-generated noise like ground-roll and air-waves are the dominant noise types, and can lead to severe degradation in data quality. In marine seismics, energy propagating as waves trapped in the water column and near-surface layers is a significant source, as well as swell noise and bulge-wave noise which result from waves propagating along the streamers of receiver devices. Other sources of coherent noise in marine seismics include passing vessels, other vessels acquiring seismic data in the vicinity, or any drilling activity close to the survey area.

An important feature of the so-called coherent noise present in seismic data is the distance over which the noise appears coherent. In many circumstances, the noise is coherent over only a few meters. In other cases, although the noise is mostly coherent, there exists spatially impulse noise. in such cases, filtering methods which have large spatial extent, like the known frequency-wavenumber filtering generate undesirable artifacts, which are mistakenly identified as seismic events after further processing and imaging.

Another feature of the noise present in seismic data is that it is often non-stationary as a function of time; i.e. its characteristics change as a function of time.

During recent years there have been suggested a variety of methods employing the central concept of applying adaptive signal processing ideas to the problem of suppressing coherent noise in seismic data. Booker and Ong, in: "Multiple-constraint adaptive filtering," Geophysics, Vol.36, pp. 498–509, 1971, have derived an algorithm for multi-channel time-series data processing, which maintains specified initial multiple filter constraints for known signal or noise sources while simultaneously adapting the filter to minimize the effect of the unknown source field. The constraints are of the multiple look-direction constraints type, where look-directions must be precisely specified.

In the International Patent Application WO97/25632, Ozbek has described a class of adaptive signal processing techniques for attenuation of dispersive, nonstationary and aliased coherent noise in seismic data, in the presence of phase and amplitude perturbations. The methods developed can be classified as multi-channel adaptive interference cancellers. Since a signal-free noise reference is not readily available in seismic data acquisition, various preprocessing techniques are introduced to generate the coherent noise reference channels. In the single-component version of the method, moveout (apparent velocity) and spatio-temporal coherence are used as the criteria for differentiating between the signal and the noise. In the multi-component version, polarization is used as an additional attribute for differentiation. Once single or multiple noise reference channels are established, coherent noise in the primary channel is canceled using data-adaptive least-squares multi-channel filter banks.

U.S. Pat. No. 4,556,962 attempts to attenuate the ground roll from a surface seismic source by placing a sensor close to the source to detect the interfering noise. The interfering noise is scaled, delayed and summed with signals from a more distant geophone array and then cross-correlated with the original vibrational source. This patent also suggests that an adaptive filter be used so as to modify the delayed signal to correspond more closely to that detected by the more distant geophone array. However, ground roll is in general of an inhomogeneous nature; due to dispersion and scattering from near surface anomalies the ground roll measured at one point increasingly deviates in character from that measured at another with increasing distance. Hence, the ground roll measured close to the source may be substantially different from that received by the geophone array, and the adaptive filter may not be able to deal with this. It is also difficult to measure seismic signals (ground roll) close to the source. Often the nearest offset is 100 meters. For close measurements, more robust sensors may be needed and detector 'character' matching should be an important preliminary step.

In U.S. Pat. No. 4,890,264 a method is proposed for suppressing non-uniformly distributed noise generated by surface wave propagation, wind, and machinery. A number of horizontally sensitive geophones are distributed amongst the conventional vertically oriented geophones. The outputs of the surface wave detectors are utilized in conjunction with an adaptive filter to cancel the effects of the surface wave interference. This method for the suppression of ground roll is inherently a multi-component method, and cannot be used in conjunction with single component acquisition. In addition, it neglects the fact that some seismic body wave energy also is detected by horizontally sensitive geophones, and this may cause signal cancellation.

In UK Patent Application GB-A-2273358 linearly constrained adaptive beamforming and adaptive interference canceling beamforming is used for ground roll suppression. In linearly constrained adaptive beamforming, signals measured by an array of geophones are filtered and summed so as to preserve signals incident from a preferred direction while suppressing interferences incident from other directions. In applying adaptive interference canceling, the moveout differential between the seismic reflections and the ground roll is used to form primary and reference channels. The filtering is performed using a continuously adaptive method such as the LMS (least-mean-square) algorithm. The suggested application is in seismic while drilling, where the horizontal offset range is very small, so that the seismic reflections have an almost vertical angle of incidence and there is effectively a lot of data available from each source-receiver position since the roller cone drill bit used as the seismic source moves very slowly. The statistics of the noise then change very slowly, allowing stochastic gradient type of algorithms like the LMS to converge. However, in surface seismic experiments the ground roll present is often non-stationary and inhomogeneous. Therefore, stochastic gradient type of algorithms such as LMS may be too slow in converging.

U.S. Pat. No. 5,237,538 proposes a method for removing coherent noise from seismic data. In this method, first the moveout characteristics of the noise are identified. Next, a space-time gate containing the noise defined and extracted, and the moveout removed to flatten the noise train. Amplitudes and time variations are then removed from the gate. The coherent noise is estimated using conventional stacking. A single-channel Wiener filter is used to match the noise estimate to the noise in the data trace containing signal-plus-noise. Having subtracted the filtered noise estimate, inverse amplitude scalars are applied to undo the effect of amplitude equalization. The signal is then moveout restored into the original seismic record. This particular method for removing coherent noise from seismic data is an application of the well-known technique called Postbeamformer Interference Cancelling. It has some particular shortcomings for application for ground roll attenuation. First, the signal always leaks into the ground roll estimate, especially for shorter arrays. There is always a component of the signal present at the reference channel which is co-located in time with the signal in the primary channel. On the other hand, when the arrays are allowed to be longer, the dispersion present in the ground roll make it difficult to achieve effective beamsteering.

In marine seismic surveys, an acoustic source generates waves which travel through the water and into the earth. These are then reflected or refracted by the sub-surface geological formations, travel back through the water and are recorded by long hydrophone arrays which are towed near the surface of the water behind a seismic vessel. The hydrophones are mounted in streamer cables, or streamers. There are usually 1–12 streamers towed which are each several kilometers long. The streamers are made up of sections which may typically be 100–200 meters long; each section consists of hydrophones inside an outer skin which may be filled with oil, foam, or a more solid substance. Stress-wires and spacers form the internal skeleton of the streamer.

While the streamers are being towed behind the vessel, self-noise is generated due to a variety of sources. The lurching of the vessel, especially in rough seas, causes vibrations in the stress-wires which interact with the connectors and the oil-filled skin, generating bulge waves (or breathing waves) which propagate down the streamers. The pressure variations are detected by the hydrophones, adding and corrupting the detected seismic signals. As the streamer moves through the water, boundary layer turbulence causes pressure fluctuations at the outer skin wall, which are again coupled to the hydrophones.

Bulge waves may also be caused by eddy shedding under elliptical water motion about the streamer caused by wave action. A method of applying adaptive signal processing to the attenuation of bulge waves is described U.S. Pat. No. 4,821,241. There it is proposed to co-locate stress sensors with the hydrophones in the streamer. The stress sensors are responsive to mechanical stresses applied to the cable, but are substantially unresponsive to acoustic waves propagating in fluid media. The signal outputs from the stress sensors are combined with the signal outputs from the corresponding co-located hydrophones to cancel spurious signals due to bulge waves.

Another method of applying adaptive signal processing to the attenuation of bulge waves was described is described U.S. Pat. No. 5,251,183. In this patent it is proposed to use an accelerometer secured between the lead-in section of the streamer and the hydrophone. Intra-shot and inter-shot accelerometer and hydrophone signals are recorded. The method utilizes inter-shot and intra-shot adaptive processing loops. The inter-shot adaptive processing loop derives inter-shot complex weights from inter-shot accelerometer signals and inter-shot hydrophone signals. The intra-shot adaptive processing loop models bulge wave noise in the intra-shot hydrophone signals by combining the inter-shot complex weights with intra-shot accelerometer signals. Bulge wave noise attenuation is achieved by subtracting the intra-shot bulge wave noise model from the intra-shot seismic detector signals.

SUMMARY OF THE INVENTION

In accordance with the present invention, there is provided a method for filtering noise from discrete noisy seismic signals, comprising the steps of receiving signals using a plurality of receivers; determining propagation characteristics of the signals with respect to receiver locations; and filtering received signals using an at least partially adaptive filter such that signals having propagation characteristics other than the determined propagation characteristics are attenuated. The filtering step comprising the step of defining at least two independent sets of conditions (constraints) with a first set defining a desired (quiescent) response and a second set defining the propagation characteristics of signals to be preserved and the step of adapting filter coefficients of the filter subject to the independent sets of conditions (constraints) so as to minimize (optimize) the filter output for signals with propagation characteristics other than the determined propagation characteristics.

For the application of the invention, it is advantageous to define for the optimization process of the filter weights or coefficients a signal-dependent part (correlation matrix) and a signal-independent part. The signal-independent part usually comprises the constraints and is there often referred to as constraint matrix. Using this concept of a constraint matrix, an important aspect of the invention can be described as having within the constraint matrix a subspace which is defined by the desired quiescent response and one subspace which defines the regions of the protected signal. By making these two subspaces orthogonal, filter weights can be found which simultaneously impose both restrictions upon the filter response. As the constraint matrix effectively reduces the degrees of freedom of the filter available for the adaptation process, this aspect of the invention can be described as splitting the total number of degrees of freedom into a first part which is available for the adaptation process and a second part which is used to define the constraints. The degrees of freedom assigned to the constraints are split among those constraints which defines the desired response and a second set defining the temporal and/or spatial spectral content or the propagation characteristics of the signals to be preserved.

It is an advantage of the method to be not confined to narrow-band signals, but also applicable to wide-band seismic signals resulting in a filter that changes its response with the frequency of the input signal(s).

It is an important aspect of the invention that having derived a method of separating the desired quiescent response and the constraints relating to the region into orthogonal subspaces, any known method can be used for the adaptation process. Such known adaptive methods are known and described in the literature, e.g. LMS, RLS, LSL, FTF, etc.

According to a preferred embodiment of the invention, a filter bank comprising temporally and spatially local filters is used as the adaptive filter.

A filter bank can be defined as comprising M local multichannel adaptive filters with K channels, each of a length L. For most applications, the number L of coefficients is equal to or larger than three. The number of channels K and of individual filters M are preferably two or more.

The use of a filter bank for noise attenuation of seismic signals has been described in the International Patent Application WO97/25632. However, the present invention does not require defining a reference channel in order to calculate the adapted filter bank coefficients. No noise estimate enters the adaptation process. Therefore, the present method can be applied to noise contaminated seismic signals, where there is no independent measurement or estimate of the noise available.

According to one aspect of the invention, the coefficients of the filter are constrained such that its response corresponds to that of a beamformer with a specified look-direction.

According to another aspect of the invention the constraints are set such that the filter preserves signals from a range of look directions or of defined regions of the frequency-wavenumber domain. The region can be pre-selected depending on the nature, more specifically on the apparent velocity of the seismic signals. Certain limits of the velocity, such as 1500 m/s, define regions in the frequency-wavenumber domain.

A further aspect of the invention comprises the minimization of a cost functional using the approximation that the sum, weighted by window functions, of the output of adjacent filters of the M filters is equal when applied to the same signal in time regions where said window functions overlap. Preferably the method includes the step of multiplying M filtered estimates with temporal window functions. The application of the temporal window functions, and hence the resulting temporal windows, to the combined components ensures that the filtering process is local in time and allows the method adaptively to remove noise from the seismic data in accordance with a global optimization criterion. The data selection temporal window functions are preferably determined by two requirements, wherein the first requirement is that the sum over all windows at any given time equals unity and the second requirement is that only adjoining windows overlap. These requirements ensure that the global optimization of the filtered signal can be solved by use of an approximation in which for the sum over all time and all filters and all neighboring filters, the error function of a neighboring filter is replaced with the error function associated with the filter itself.

The application of the data selection temporal windows decouples the equation required to solve the optimization of the filtered signal.

According to yet another aspect of the invention, the response of the filter can be controlled by using a regularization parameter. The parameter as applied herein determines the relative weight of two components of the cost functional. One of the component of the cost functional can be defined as output power, while the other can be characterized as being essentially the white noise gain of the filter bank, i.e., the output of the filter in response to an input uncorrelated in time and space.

The noisy signal may be pre-processed before being passed to the adaptive filtering means by dividing the signal into frequency bands using a reconstructing filter, for example a quadrature mirror filter. This allows a reduction in the number of data points to be processed and also allows a reduction in the number of coefficients in the adaptive filtering means as effectively reducing the bandwidth of the original signal.

The invention is applicable for two-dimensional (2D) and three-dimensional (3D) seismic surveys, and can be used in land seismic, marine seismic including sea bottom seismic, and transitional zone seismic.

The method can be performed on stored data or on raw seismic data as it is acquired. Thus raw seismic data may be filtered according to the method at the data acquisition site. This ensures that a "cleaned" signal is available from the data acquisition site and may be downloaded directly from the site in this form. This reduces the amount of data sent for analysis off-site and reduces the costs and storage problems associated with accumulating sufficient quantities of noisy data for analysis off-site. The method can be advantageously applied to single-sensor recordings, i.e. to recordings prior to any group forming which combines the signals of two or more seismic sensors.

Although the description of the present invention is based on seismic signal processing, it can be applied to sonic signals as used for example for well logging applications. Specific seismic applications include swell noise or streamer noise attenuation, including streamer noise attenuation in a cross-flow acquisition, attenuation of ground roll or mud roll or other coherent noise from marine, land, or transition zone data, seismic interference canceling, i.e. filtering noise using the full aperture of a multi-streamer array, which is either towed in the water or deployed at the sea-bottom , or removal of sea-floor reflections from the notional source signature estimation, a technique described for example in the European Patent Application EP-A-066423. Other applications include noise suppression for various borehole seismic exploration methods, where either noise or signal has preferential directions. Known borehole seismic methods include seismic-while-drilling (SWD), vertical seismic profiling (VSP), look-ahead and look-around while drilling.

These and other features of the invention, preferred embodiments and variants thereof, possible applications and advantages will become appreciated and understood by those skilled in the art from the following detailed description and drawings.

MODE(S) FOR CARRYING OUT THE INVENTION

In the following the basic concepts underlying the invention are developed in detail.

Figure 1:
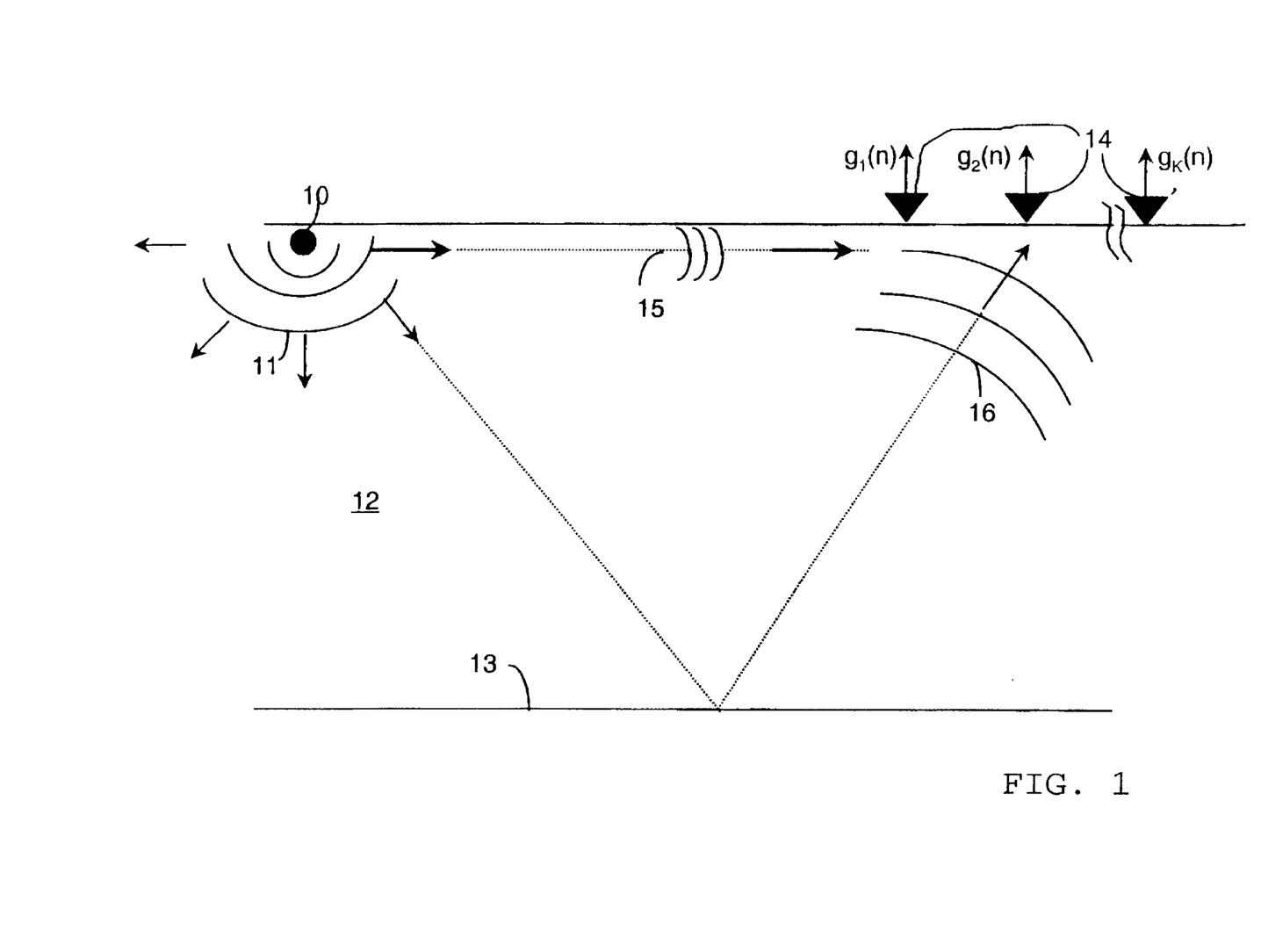
FIG. 1 illustrates general elements of a seismic land acquisition.

A typical land seismic acquisition is illustrated in FIG. 1.

A source 10 is activated, thus generating seismic waves 11, i.e acoustic waves with frequencies of less than 500 Hz. The waves travel though the interior of the Earth 12 and are reflected at various locations. Even though only one reflector 13 is shown, typically there are many reflectors, each reflecting a fraction of the seismic wave back to the surface. At the surface, seismic waves are recorded by seismic sensors 14 (geophones). These sensors are spread along a line or in a two-dimensional pattern.

As an example for a major source of noise, the travel path 15 of the so-called "ground roll" is shown. The ground roll is direct wave energy which propagates within layers close to the surface. It is one distinguishing feature of the ground roll to have different propagation characteristics than signals reflected from a deeper reflector layer: The ground roll reaches the sensors of the depicted sensor line one after the other. In contrast, the reflected seismic signal 16 from a reflector at great depth reaches all the sensors 14 almost simultaneously. When translated into the frequency-wavenumber domain, known as f–k domain, the desired seismic signal therefore usually lies within a narrow cone around the f-axis (equivalent to small values of k) whereas the ground roll tends to have larger values of k.

Figure 2:
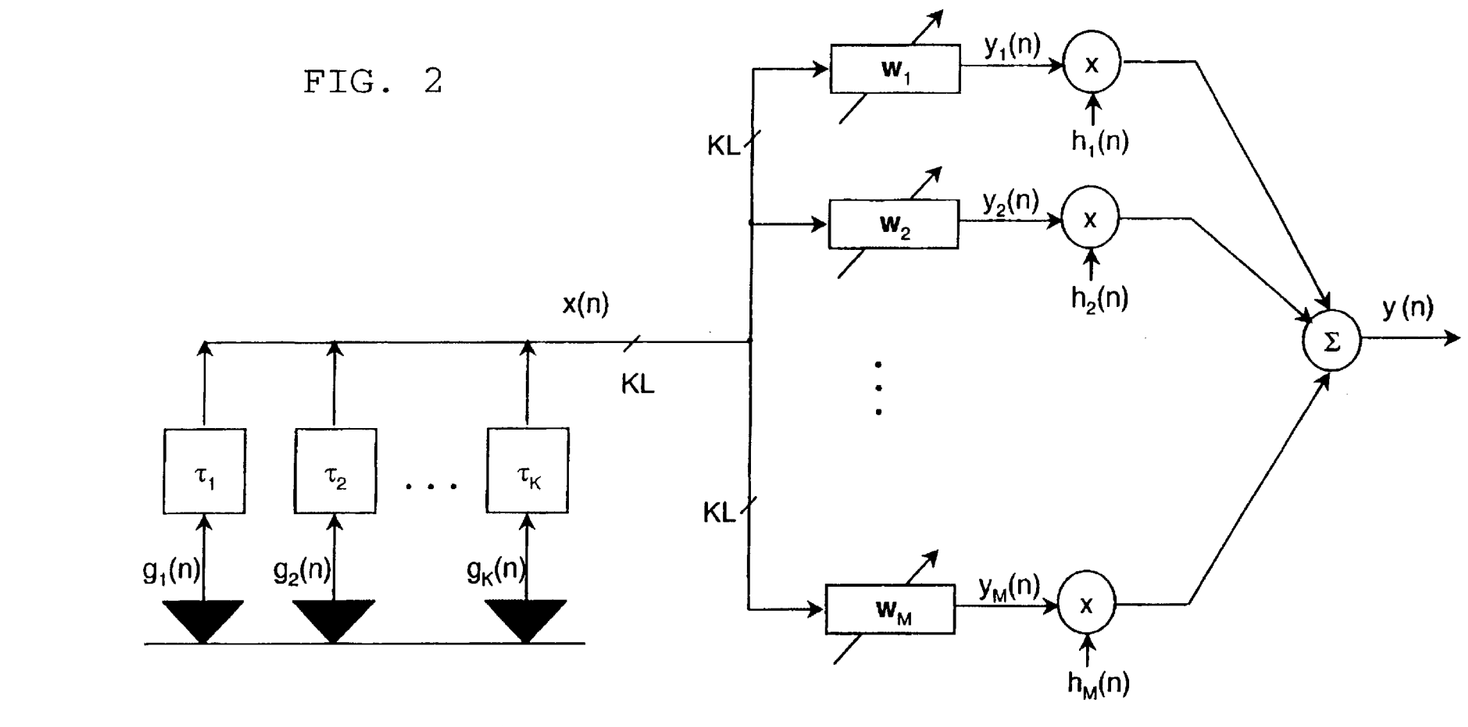
FIG. 2 shows a general block diagram of an adaptive beamformer in accordance an example of the present invention.

Referring now to FIG. 2, there is shown a general block diagram of an adaptive beamformer in accordance with the present invention. It is assumed the presence of K sensors located at $r_k$ with $k=1, \ldots, K$. Each sensor k records a signal $g_k(n)$ with $n=1, \ldots, N$. The letter 'n' is used as an index on discrete time samples. The sampling interval is $\Delta t$. The signals $g_k(n)$ are beamsteered using delays $\tau_k$ towards a general "signal direction". This is the general direction from which the seismic signals are expected to arrive. The beamsteered channels $x_k(n)$ are processed by local multichannel adaptive filters to produce the output signal:

$$y(n) = \sum_{i=1}^{M} \sum_{k=1}^{K} \sum_{v=-L_1}^{L_2} h_i(n) w_{ikv} x_k(n-v) \quad [1]$$

where $w_{ik}v(t)$ are the adjustable coefficients of the adaptive filters, $h_i(n)$ are the windows applied at the output end, M is the number of local multichannel adaptive filters (or the number of output windows), and $L=L_1+L_2+1$ is the number of coefficients per channel. Here and below, a bar under a letter denotes a vector (small letter) or a matrix (capital letter).

Equation [1] can be rewritten as a (windowed) sum over a scalar product using a tap-input vector x(n) at time t defined as:

$$x(n)=[x_1(n+L_1), \ldots, x_1(n-L_2),$$
$$x_2(n+L_1), \ldots, x_2(n-L_2),$$
$$x_K(n+L_1), \ldots, x_K(n-L_2)]^T \quad [2]$$

and a tap-weight vector $w_i$ defined as $$w_i=[w_{i1(-L_1)}, \ldots, w_{i1L_2}, w_{i2(-L_1)}, \ldots, w_{i2L_2}, w_{iK(-L_1)}, \ldots, w_{iKL_2}]^T \quad [3]$$

Using definitions [2] and [3], equation [1] becomes $$y(n) = \sum_{i=1}^{M} h_i(n) w_i^T x_k(n) = \sum_{i=1}^{M} h_i(n) x^T(n) w_i. \quad [4]$$

Equations [1] and [4] describe how to find the beamformer or filter bank output once the M tap-weight vectors $w_i$ have been specified. These vectors are computed as the solution of an optimization problem which is described below.

The optimization problem is defined as $$\min_{w_1, \ldots, w_M} J = \min_{w_1, \ldots, w_M} \left\{ J_1 + \frac{\delta^2}{KL} J_2 \right\} \quad [5]$$

subject to constraints $$C^T w_i = f \quad [6]$$

where $i=1, 2, \ldots, M$ and $$J_1 = \sum_{n=1}^{N} y^2(n) \quad \text{and} \quad [7]$$

$$J_2 = \sum_{i=1}^{M} \|w_i\|^2 \sum_{n=1}^{N} h_i(n) \|x(n)\|^2, \quad [8]$$

KL is the total number of filter coefficients, and $\|\cdot\|$ denotes the $L_2$ norm. This cost functional is a linear combination of the output power of the beamformer (the first term in eq. [5]), and the so-called "white-noise gain" of the beamformer weighted by the input power (the second term in eq. [5]). The relative weight of the two terms is adjusted by the $\delta^2$ term. Including the "white-noise gain" of the beamformer in the cost functional is intended to increase the beamformer robustness in the presence of signal modeling uncertainties (sometimes called perturbations,) and numerical correlation between the signal and the noise.

Equation [6] describes Q linear constraints on the admissible solutions to the optimization problem. Here, the KLxQ matrix C is the constraint matrix, and the Q-vector f is the response vector. The actual design of the linear constraints are discussed below.

A possible solution of the optimization depends on imposing the following two constraints on the window functions $h_i(n)$:

$$\sum_{i=1}^{M} h_i(n) = 1 \quad [9]$$

for n =1, 2, . . . , N, and $$h_i(n)h_j(n)=0 \quad [10]$$

for j<>i−1,i,i+1. The first constraint ensures that the filter bank is equivalent to the single filter case if all the local filters (w$_i$)are identical. The second constraint ensures that the windows have compact support.

The optimization problem can be to a large extend decoupled using the second condition(eq. [10]), and the approximation $$\sum_n \sum_i \sum_{j=i-1,i+1} h_i(n)h_j(n)\underline{w}_i^T\underline{x}(n)\underline{x}^T(n)\underline{w}_j \approx \quad [11]$$

$$\sum_n \sum_i \sum_{j=i-1,i+1} h_i(n)h_j(n)\underline{w}_i^T\underline{x}(n)\underline{x}^T(n)\underline{w}_i.$$

The approximation of equation [11] requires that neighboring filters produce similar results when applied to the same input data in time regions where adjacent windows overlap, instead of requiring that neighboring filters are similar on a point-by-point basis. Thus, the approximation is similar to requiring that the integral of two functions are close, rather than the functions themselves.

With this approximation, the first term of the cost functional, J$_i$, becomes $$J_1 = \sum_{i=1}^{M} \underline{w}_i^T \Phi_i \underline{w}_i \quad \text{with} \quad [12]$$

$$\Phi_i = \sum_n h_i(n)\underline{x}(n)\underline{x}^T(n). \quad [13]$$

The second term in the cost functional can be rewritten as:

$$J_2 = \sum_{i=1}^{M} \|w_i\|^2 tr\left\{\sum_{n=1}^{N} h_i(n)\underline{x}(n)\underline{x}^T(n)\right\}, \quad [14]$$

with "tr" denoting the trace of a matrix.

Combining Equations (5), (12), (14), and reorganizing the terms, the total cost functional can be written as:

$$J = \sum_{i=1}^{M} \underline{w}_i^T \left\{\Phi_i + \frac{\delta^2}{KL} tr(\Phi_i)I\right\}\underline{w}_i, \quad [15]$$

where I denotes the KLxKL identity matrix. The decoupled optimization problem can be solved for each of the M time windows subject to the constraints [6] Using the method of Lagrange multipliers, the optimal tap-weight in each window is given by $$w_i^* = \Phi_i^{-1}C(C^T\Phi_i^{-1}C)^{-1}f, \quad [16]$$

with $$\tilde{\Phi}_i = \Phi_i + \frac{\delta^2}{KL} tr(\Phi_i)I, \quad [17]$$

The second term of the modified local correlation matrix $\tilde{\Phi}_i$ can be regarded as a regularization term with $\delta^2$ as the regularization parameter. In array signal processing literature, regularization of correlation matrices with the addition of a scaled identity matrix has been suggested to increase robustness in the presence of perturbations, in the context of narrow-band beamforming. Here, the cost functional [5] includes the regularization term from the beginning leading to a generalization for wide-band adaptive beamforming. Hence, the filter response changes as a function of the frequency of the signal.

When the input data to the beamformer is characterized by spatially and temporally uncorrelated (or white) noise, both the correlation matrix $\Phi_i$ and the modified correlation matrix $\tilde{\Phi}_i$ become proportional to the identity matrix. In this case, the optimal weight vector becomes $$w_i^* = w_q = C(C^TC)^{-1}f. \quad [18]$$

The weight vector w$_q$ is called the quiescent solution to the optimal beamformer problem, and the corresponding response is known as the quiescent response. Note that the quiescent solution depends entirely on the constraint matrix C and the response vector f.

The optimal weight vector w$_i$ approaches the quiescent weight vector w$_q$ even for general noise fields as the regularization parameter $\delta^2$ is increased. In this case, the modified correlation matrix $\tilde{\Phi}_i$ approaches the identity matrix (cf. [17]). The regularization parameter $\delta^2$ therefore weights the optimal solution between a solution that is entirely dependent on the received data, and a solution that is independent of the data. For $\delta^2=1$, both solutions are equally weighted in the sense that their corresponding correlation matrices have equal trace value. In situations where the perturbations are higher, i.e. the assumptions about the seismic acquisition geometry do not exactly hold, finding a beamformer response with a higher level of regularization can give more robust results.

Another aspect of the invention relates to the design of linear constraints (eq. [6]) to be imposed on the beamformer.

One type of linear constraints that can be imposed on the beamformer are those designed to preserve seismic signals incident from a target direction, while suppressing interferences incident from other directions. Steering delays $\tau_k$ as those shown in FIG. 2 define a single "look-direction". Signals incident in this direction are in phase, and for these signals the system can be considered as a single FIR (finite impulse response) filter. The values of the coefficients for this equivalent processor are equal to the sums of the corresponding coefficients in the adaptive processor. Each local beamformer w$_i$ consists of the adaptive filters w$_{i1}$, w$_{i2}$, w$_{iK}$ processing data from each channel, and a summing unit. The sum of the individual filters w$_{i1}$, w$_{i2}$, . . . , w$_{iK}$ is constrained to give w$_{eq}$, which is the desired response for signals incident in the look-direction, e.g., a unit pulse in the look direction. The quiescent response then becomes that of a fixed-weight beamformer with single equal weights for all elements. In the frequency-wavenumber domain, this corresponds to a sync function that is constant in the f direction. Therefore, for increasing values of the regularization parameter $\delta^2$, the beamformer preserves signals incident not only from the look direction, but also from neighboring directions.

As discussed in the last section, using single look-direction constraints and regularization, it is possible to preserve signals incident from directions near the look direction. While this approach is useful and sufficient for many applications, it is desirable to derive more general linear constraints that will satisfy the requirements in any seismic data acquisition situation more directly.

In narrow-band beamforming, different generalized constraint design approaches are known. Derivative constraints are used to influence response over a region of the response space by forcing the derivatives of the beamformer response at certain points of the response space to be zero. Eigenvector constraints are based on a least squares approximation to the desired response, and are usually used to control the beamformer response over regions of the response space. Generalization of these methods to wide-band beamforming problems have shown that while they provide a good response in selected regions of the response space, they can generate unacceptably high sidelobes in other regions.

For the present invention, the requirements of the generalized constraint design are to impose an arbitrary quiescent response on the beamformer and to make sure that certain areas in the frequency-wavenumber domain are entirely controlled by the quiescent response. These requirements have been established with the following functional objectives in mind:

- accommodation of an arbitrary range of apparent signal velocities;
- increased robustness to perturbations;
- capability to use larger arrays;
- being able to run the adaptive beamformer with a lower regularization level ($\delta^2$), hence achieving higher noise attenuation; and
- achieving higher noise attenuation for a given level of regularization by the appropriate design of the quiescent response.

To impose an arbitrary quiescent response on the beamformer, use can be made of the fact that the linear constraints [6] define a Q-dimensional hyperplane in a KL-dimensional space. Equation [18] shows that the quiescent weight vector $w_q$ is the minimum norm solution to Equation [6], i.e., it is the shortest vector from the origin to the hyperplane.

Equation [18] also shows that $w_q$ is a member of the subspace spanned by the columns of the constraint matrix C. The columns of C are in general independent (otherwise some constraints would be redundant), thus they can be chosen to be orthogonal without loss of generality. After defining a desired quiescent weight vector $w_{qd}$, this suggests the following forms for the constraint matrix C and the response vector f:

$$C=[\alpha w_{qd}, D] \qquad [19]$$

and $$f=[\begin{smallmatrix}\beta\\0\end{smallmatrix}], \qquad [20]$$

with the condition $$\beta=\alpha\|w_{qd}\|^2 \qquad [21]$$

where D is a KL×(Q−1) matrix whose columns are orthogonal to $w_{qd}$. The exact form of the matrix D is described below. With C and f chosen according to [19] and [20], respectively, it can be shown that the desired weight vector equals the quiescent response vector $w_q$ (eq. [18]).

After defining the first column of the constraint matrix C and the response vector f to impose the quiescent weight vector, the definition of the matrix D which is a part of C is derived in the following sections.

Figure 3:
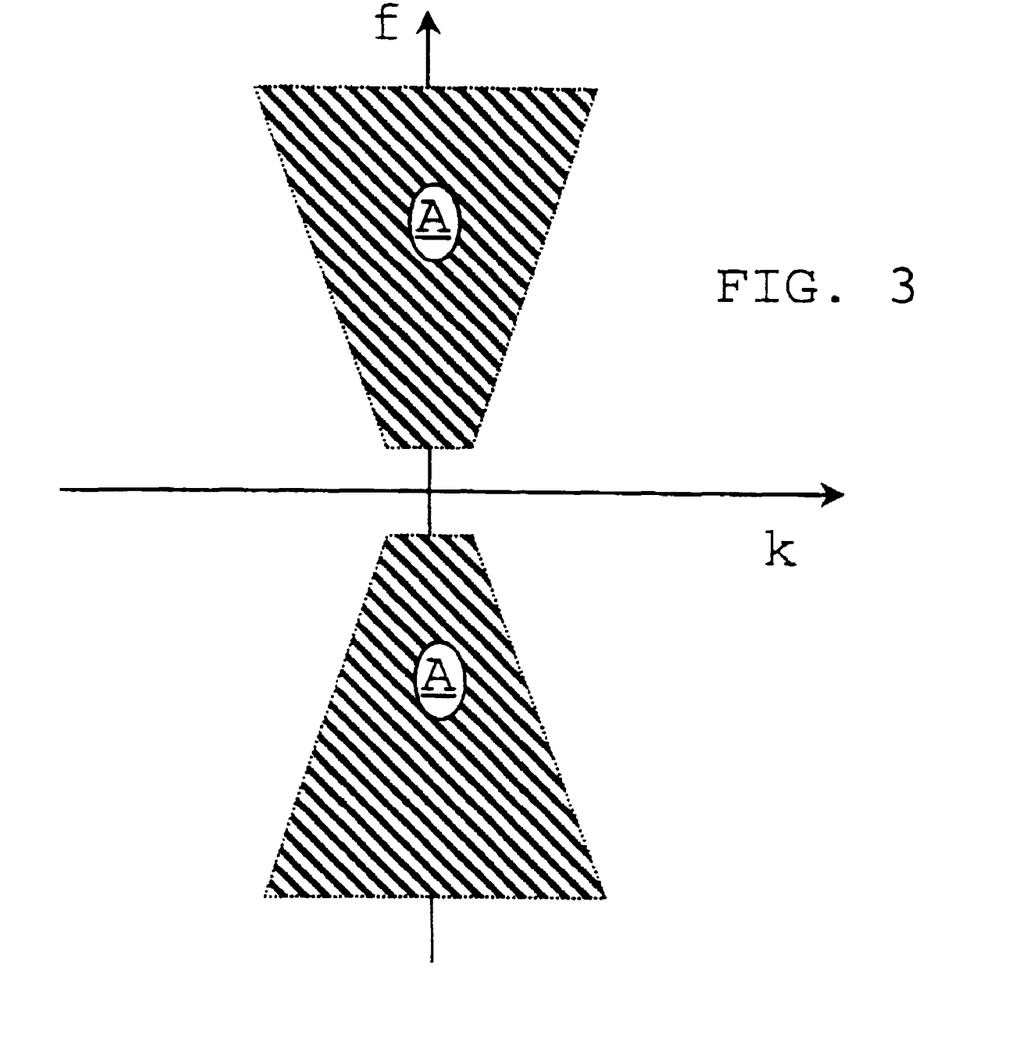
FIG. 3 shows the example of a region preserved by an adaptive beamformer in accordance with an example of the present invention.

In a seismic acquisition, reflection signals that should be preserved can be considered as a linear combination of plane waves with associated frequency and wavenumber values from a known region of the frequency-wavenumber space. This region, which is denoted A in FIG. 3, depends on the particular acquisition geometry, but is usually a cone around the frequency axis. One possible example of a preserved region in the frequency-wavenumber domain is shown in FIG. 3, where A is chosen so as to include all signals of apparent velocity of +/−1500 m/s or more. In the present example, the beamformer response in region A should be controlled entirely by a quiescent response which preserves the signal.

The set $S_A$ of seismic signals to be preserved by the filtering process is defined by $$S_A=\{s(t, r): s(t, r)=\int\int_A df dk S(f, k)e^{j2\pi(ft-k\cdot r)}\} \qquad [22]$$

as composites of plane waves with associated frequencies and wavenumber values from a region A, where S(f,k) is the complex Fourier amplitude corresponding to the plane wave component of a signal with frequency f and wavenumber k.

Using [22], the tap-input vector [2] can be rewritten as $$s(n)=\int\int_{(f,k\in A)} df dk S(f, k)e^{j2\pi fn\Delta t}d(f, k), \qquad [23]$$

with d(f,k) being defined as the array steering vector corresponding to the plane wave component specified by particular frequency f and wavenumber k. It is noteworthy that in contrast to the example described above no time delays $\tau$ have been introduced into the signal path to steer the filter response. The array steering vector can be written as a Kronecker product:

$$\underline{d}(f, \underline{k}) = \begin{bmatrix} e^{-j2\pi\underline{k}\cdot r_1} \\ e^{-j2\pi\underline{k}\cdot r_2} \\ \vdots \\ e^{-j2\pi\underline{k}\cdot r_k} \end{bmatrix} \otimes \begin{bmatrix} e^{j2\pi fL_1\Delta t} \\ \vdots \\ 1 \\ \vdots \\ e^{-j2\pi fL_2\Delta t} \end{bmatrix}. \qquad [24]$$

Using [4], the response of the beamformer to the signal tap-input vector s(n) is $$y(n) = \sum_{i=1}^{M} h_i(n) \int\int_A df dk S(f, k)^T e^{j2\pi fn\Delta t} d^T(f, \underline{k}) w_i. \qquad [25]$$

For the beamformer response to be the same for both the optimal weight vector $w_i$ and the quiescent weight vector $w_q$, and further requiring that this equality to hold for all signals s(t; r) of the preserved region, i.e. signals with arbitrary associated Fourier coefficients S(f, k) such that (f, k) is in A. This requires that $$d^T(f, k)w_i^* = d^T(f, k)w_q, \forall (f, k)\in A. \qquad [26]$$

By decomposing the optimal weight vector into a fixed weight portion equal to the quiescent weight vector and an adaptive weight portion according to a solution known as "generalized sidelobe canceller" (GSC), it can be shown that the last equation is equivalent to requiring that d(f,k) lies in the column space of the constraint matrix C.

It is therefore a further object of the present invention to find a efficient, i.e. preferably low rank, basis for the space of steering vectors d(f,k). However, a scalar multiple of $w_{qd}$ has already been installed as the first column of C, we actually need to find a low rank basis for the part of this space that lies in the orthogonal complement subspace of $w_{qd}$. The projection of d(f,k) onto the orthogonal complement of $w_{qd}$ is the projected steering vector:

$$\tilde{d}(f, k) \equiv (I - P_{w_{qd}}) d(f, k), \qquad [27]$$

where the expression in parentheses is the orthogonal complement projector with respect to $w_{qd}$ with $$P_{w_{qd}} = w_{qd}(w_{qd}^T w_{qd})^{-1} w_{qd}^T \qquad [28]$$

Using the fact that any KL-dimensional $\tilde{d}(f,k)$ can be written as a linear combination of orthonormal vectors $\{v_1, \ldots, v_{KL}\}$, $$\tilde{d}(f, \underline{k}) = \sum_{p=1}^{KL} \sigma_p(f, \underline{k}) \underline{v}_p \equiv V \sigma(f, \underline{k}), \qquad [29]$$

a rank P (P<KL) approximation of the projected steering vectors is obtained by $$\tilde{d}_p(f, \underline{k}) = \sum_{p=1}^{P} \hat{\sigma}_p(f, \underline{k}) \underline{v}_p \equiv V \hat{\sigma}(f, \underline{k}), \qquad [30]$$

where $$\hat{\sigma}(f, k) = [\sigma_1(f, k), \ldots, \sigma_p(f, k), 0, \ldots, 0]^T. \qquad [31]$$

To derive an efficient rank P representation of $\tilde{d}(f,k)$ for any (f,k) in region A, an error functional with respect to the $L_2$ norm is defined as $$\mu_P \equiv \int\int_A df d\underline{k} \| \tilde{d}(f, \underline{k}) - \tilde{d}_P(f, \underline{k}) \|^2. \qquad [32]$$

Using the correlation of all projected steering vectors in region A of the frequency-wavenumber space given by $$\tilde{R}_A \equiv \int\int_A df d\underline{k} \tilde{d}(f, \underline{k}) \tilde{d}^H(f, \underline{k}) \qquad [33]$$

the error functional can be expressed as $$\mu_P = \sum_{p=P+1}^{KL} \underline{v}_p^H \tilde{R} \underline{v}_p. \qquad [34]$$

The superscript "H" denotes the conjugate transpose of a vector or matrix.

The optimum set of ordered basis vectors v can be found by minimizing the cost functional $\mu_p$ subject to the constraint that $v_p^H v_p = 1$, with $1 \leq p \leq KL$. Using Lagrange multipliers, the task is to minimize $$\sum_{p=P+1}^{KL} \left[ \underline{v}_p^H \tilde{R}_A \underline{v}_p - \lambda_p (\underline{v}_p^H \underline{v}_p - 1) \right]. \qquad [35]$$

By taking the gradient with respect to $v_p$ and setting it to zero, the optimal basis vectors $v_1, \ldots, v_{KL}$ are found as the eigenvectors of $R_A^-$ (with respect to the eigenvalues $\lambda_p$). The missing part D of the constraints matrix C (cf. [19]) can now be defined as the principal eigenvectors of $R_A^-$:

$$D = [v_1, \ldots, v_p]. \qquad [36]$$

Note that the steering vectors d(f; k) are in general complex valued. Therefore, their correlation matrix $R_A^-$ over a general region A in the frequency-wavenumber space is complex valued, making the eigenvectors of $R_A^-$ hence the columns of C also complex valued. However, in seismics the signals are real valued signals which have complex conjugate Fourier coefficients. Therefore the types of A regions that are of interest are always symmetric in the frequency-wavenumber space with respect to the origin. The resulting matrices ($R_A^-$, C) are then all real valued.

The above described expansion of the projected steering vectors $\tilde{d}(f; k)$ is analogous to the Rarhunen-Lòeve expansion. While the original Karhunen-Loeve expansion is for a random vector, the expansion presented here is for a deterministic set of vectors. This is reflected in the way the approximation error functional $\mu_p$ is defined, cf. [32].

The covariance matrix of steering vectors, similar to the correlation matrices defined in [33] was first introduced in by K. M. Buckley, IEEE Trans. Acoust. Speech Signal Processing, Vol ASSP-35, 249–266, March 1987, but was then heuristically defined within a stochastic framework, assuming zero mean signals and using a narrow-band representation of wideband signals. In the description of the present invention, the correlation matrix has been derived from first principles within a deterministic framework.

Figure 4:
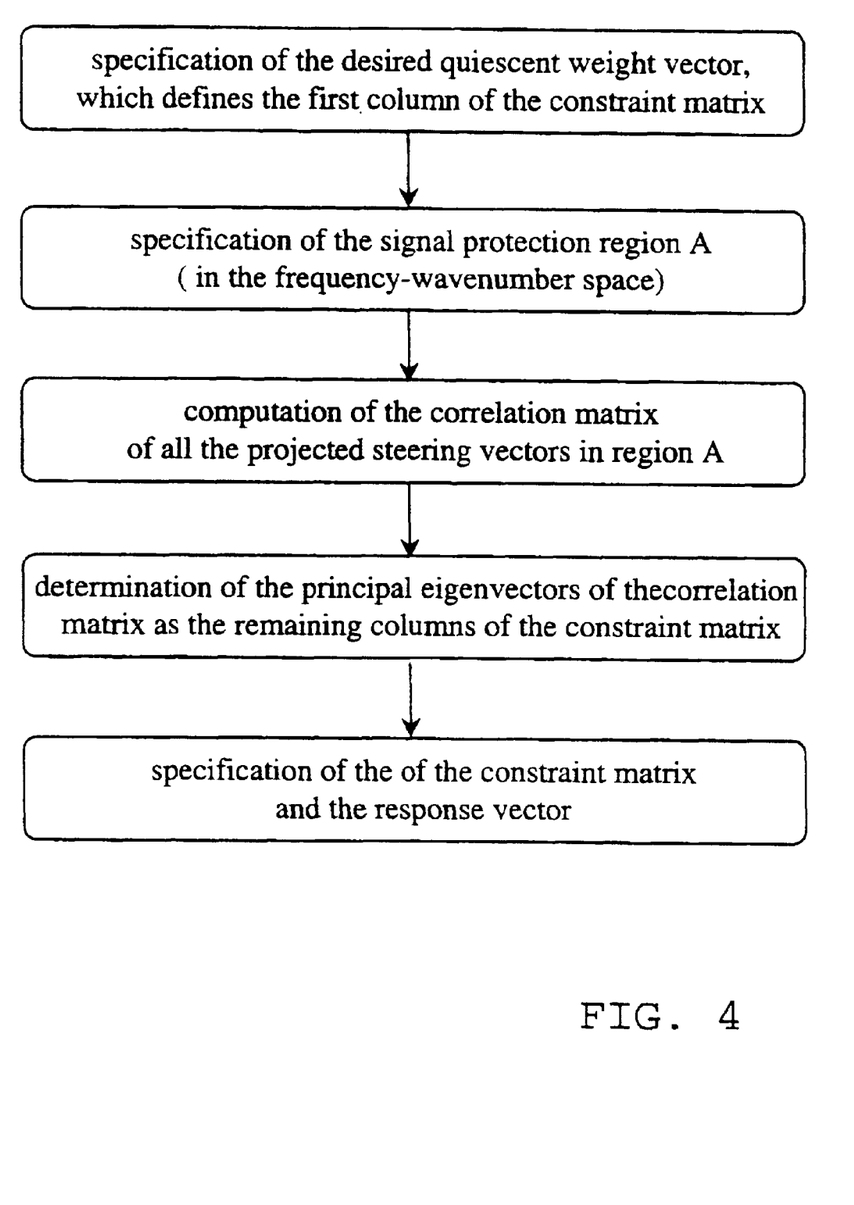
FIG. 4 shows steps of defining a constraint matrix in accordance with an example of the present invention.

The main steps of the generalized constraint design method are shown in the flow diagram of FIG. 4. They include:

specification of the desired quiescent weight vector, $w_{qd}$, which defines the first column of the constraint matrix;

specification of the signal protection region A in the frequency-wavenumber space;

computation of $R_A^-$, the correlation matrix of all the projected steering vectors in region A; and determination of the principal eigenvectors $\{v_1, \ldots, v_{KL}\}$ of $R_A^-$ as the remaining columns of the constraint matrix.

Having computed these, the constraint matrix is specified as $$C = [w_{qd}/\|w_{qd}\|^2, v_1, \ldots, v_p] \qquad [37]$$

and the response vector as $$\underline{f} = \begin{bmatrix} 1 \\ \underline{0} \end{bmatrix}, \qquad [38]$$

using a convenient choice for $\alpha$ and $\beta$ in eq. [21]

The specification of the desired quiescent weight vector to form a desired quiescent response is essentially a non-adaptive multidimensional filter design problem, for which many techniques exist. Reference can be made for example to handbooks such as W. Chen (ed.), "The Circuits and Filters Handbook", IEEE and CRC Press, 2732–2761 (1995), D. E. Dudgeon and R. M. Martinez, "Multidimensional Digital Signal Processing", Prentice Hall (1984), or J. S. Lim, Two-Dimensional Signal and Image Processing, Prentice Hall (1990).

Figure 5:
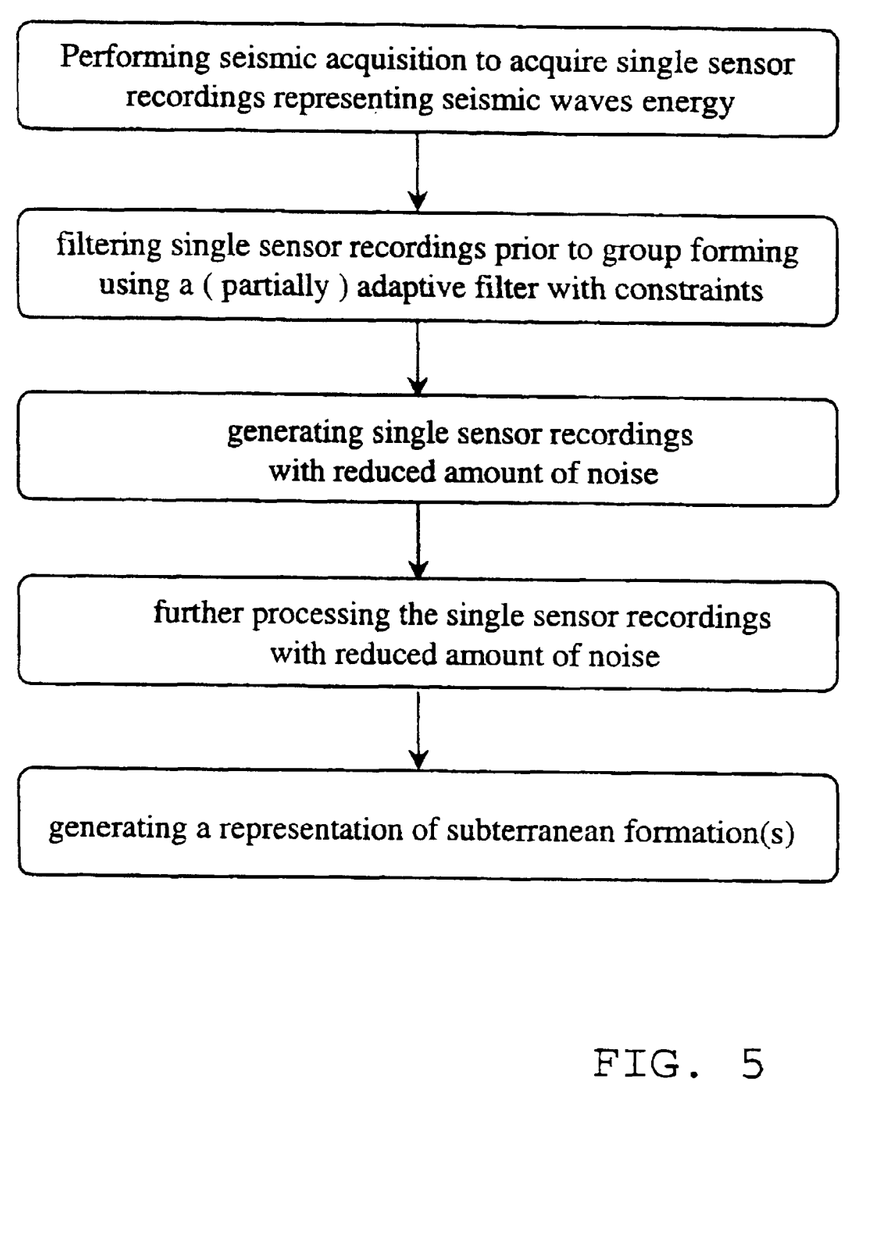
FIG. 5 illustrates steps of using the constraint matrix in a process of filtering seismic recordings in accordance with the present invention.

Once the constraint matrix is defined, digitized recordings of single seismic sensors can be filtered to generate a single sensor recording with reduced noise. The "cleaned" recording can then be used in further processing steps, such as group forming, stacking, velocity analysis, moveout correction etc., known in the art to ultimately generate a representation of subterranean formations. These steps are outlined in the flow diagram of FIG. 5. As however the details of these steps (with the exception of the filtering step) are of no particular concern regarding the present invention, are detailed description thereof is omitted herein.

The following section presents alternative methods of efficiently defining the region A (see FIG. 3) protected by the quiescent response.

For seismic applications, the quiescent weight vector could be designed such that over the region A in the frequency-wavenumber space the response is near unity, thus preserving the seismic signals in that region. In regions of the frequency-wavenumber space where the noise is expected to be present, the quiescent response should have low values, so that even when regularization is used, high performance can be achieved.

The constraint design process can be extended as described in the next section. The constraint design outlined above resulted in a low rank basis of projected steering vectors in A. The objective was to preserve all signals in the preserved region A without any reference to their relative strength. This is reflected in the choice of the error functional $\mu_p$, defined in [32]. In many applications this choice makes sense, where it is desirable to protect signal components which have much lower amplitude then other signal components. On the other hand, in some other applications it may be desirable to minimize the power of the overall signal distortion.

This extension of the above described method is reflected by a generalization of the definition of $\mu_p$ to $$\mu_p = \int\int_A df dk S(f, k) \|d(f, k) - d_p(f, k)\|^2. \quad [39]$$

The correlation matrix of the original steering vectors in A then becomes $$R_A = \int\int_A df dk |S(f, k)|^2 d(f, k) d^H(f, k). \quad [40]$$

A correlation matrix of the projected steering vectors can be derived from [40] using the orthogonal complement projector (eqs. [27], [28])

$$\tilde{R}_A = (I - P_{w_{qd}}) R_A (I - P_{w_{qd}}). \quad [41]$$

Figures 6, 7A:
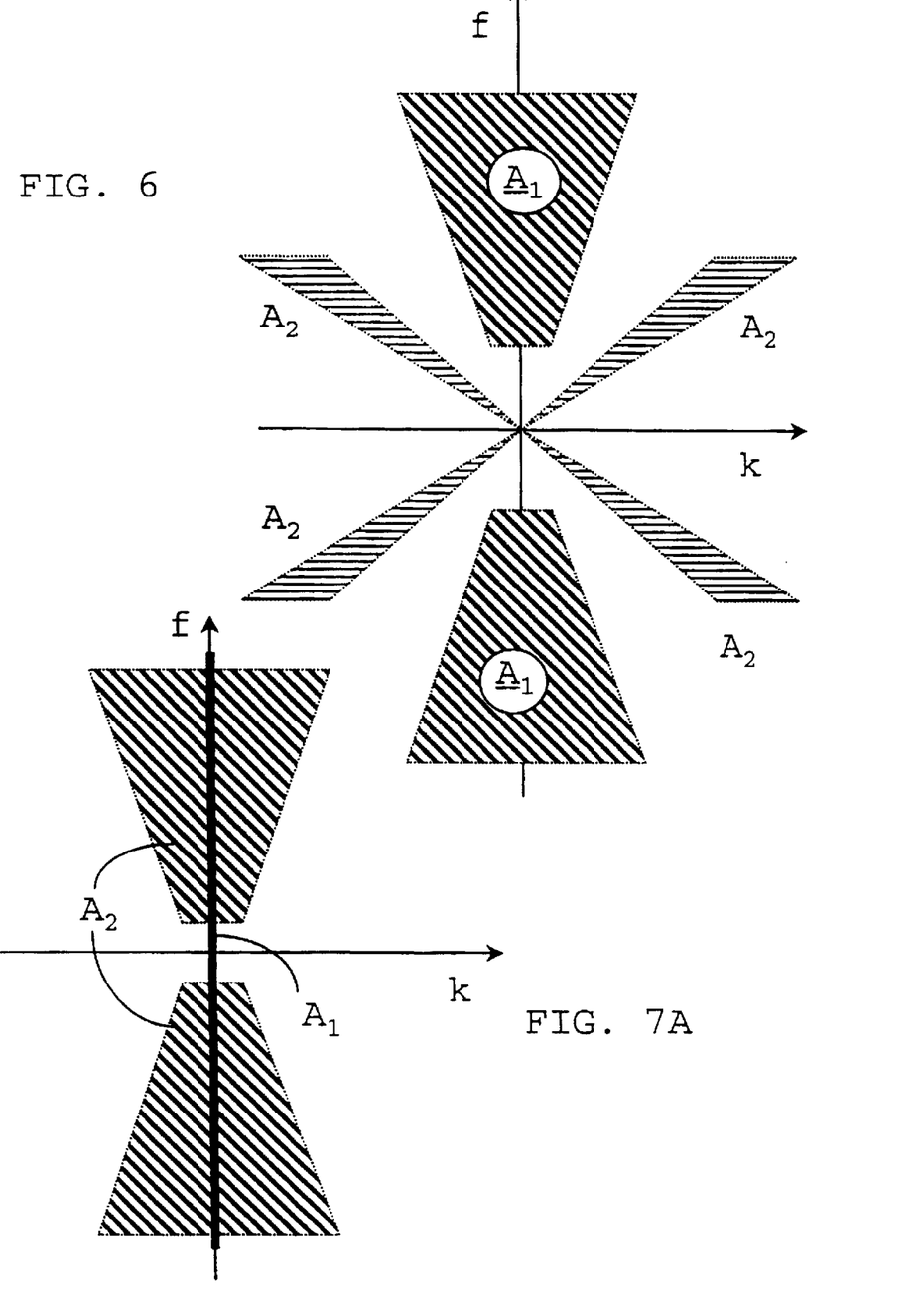
FIG. 6 shows the example of a preserved region including a noise region suppressed by an adaptive beamforming process in accordance with an example of the present invention.
FIGS. 7A–C show examples of defining a preserved region or regions in accordance with the present invention.

In some applications, it may be desirable to reserve additional regions of the frequency-wavenumber space over which the beamformer response would be controlled entirely by the quiescent response. In FIG. 6, there is shown an example of region A in the frequency-wavenumber space which includes signal protection region A1 and noise region A2. If it is known that in a certain environment there is almost always a coherent noise component occupying the region A2, then it may be beneficial to design the quiescent weight vector $w_{qd}$ which would put deep nulls in that region, i.e, which suppresses any signal from a direction (f,k) where (f,k) is element of A2. Then, the adaptive weights would concentrate on attenuating the noise in the remaining regions of the frequency-wavenumber space.

Employing the generalized constraint design methodology, the quiescent response of the beamformer can be specified exactly, and the beamformer response over a pre-specified region A in the f-k space can be constrained to approximate the quiescent response to an arbitrary extent. The accuracy of this approximation is controlled by the user parameter P, which is the number of principal components of $R_A^-$. As P is increased, more and more degrees of freedom of the beamformer are fixed, and the adaptive degrees of freedom are reduced. As P approaches KL-1 the beamformer response approaches the quiescent response not only in A, but over the entire f-k space regardless of the noise field characteristics or the regularization parameter used.

When the region A is relatively large, the distribution of the eigenvalues of $R_A^-$ may be only slowly decreasing, so that the number of principal components required to adequately represent the space of steering vectors in A may be high. If only a small number of principal components are used in order to keep more degrees of freedom adaptive, the response of the beamformer may deviate from the quiescent response in A significantly. This may happen even over the original look direction indicated by k=0. This is in contrast with the original single "look-direction" constraints described before, which guarantee that the response over the k=0 line is identically unity for all frequencies.

In order to guarantee that the response of the beamformer is exactly that of the quiescent response over k=0 as in the case of single look-direction constraints while constraining the response arbitrarily tightly in the rest of region A, the region A is preferably partitioned and each section is treated separately.

Figures 7B, 7C:
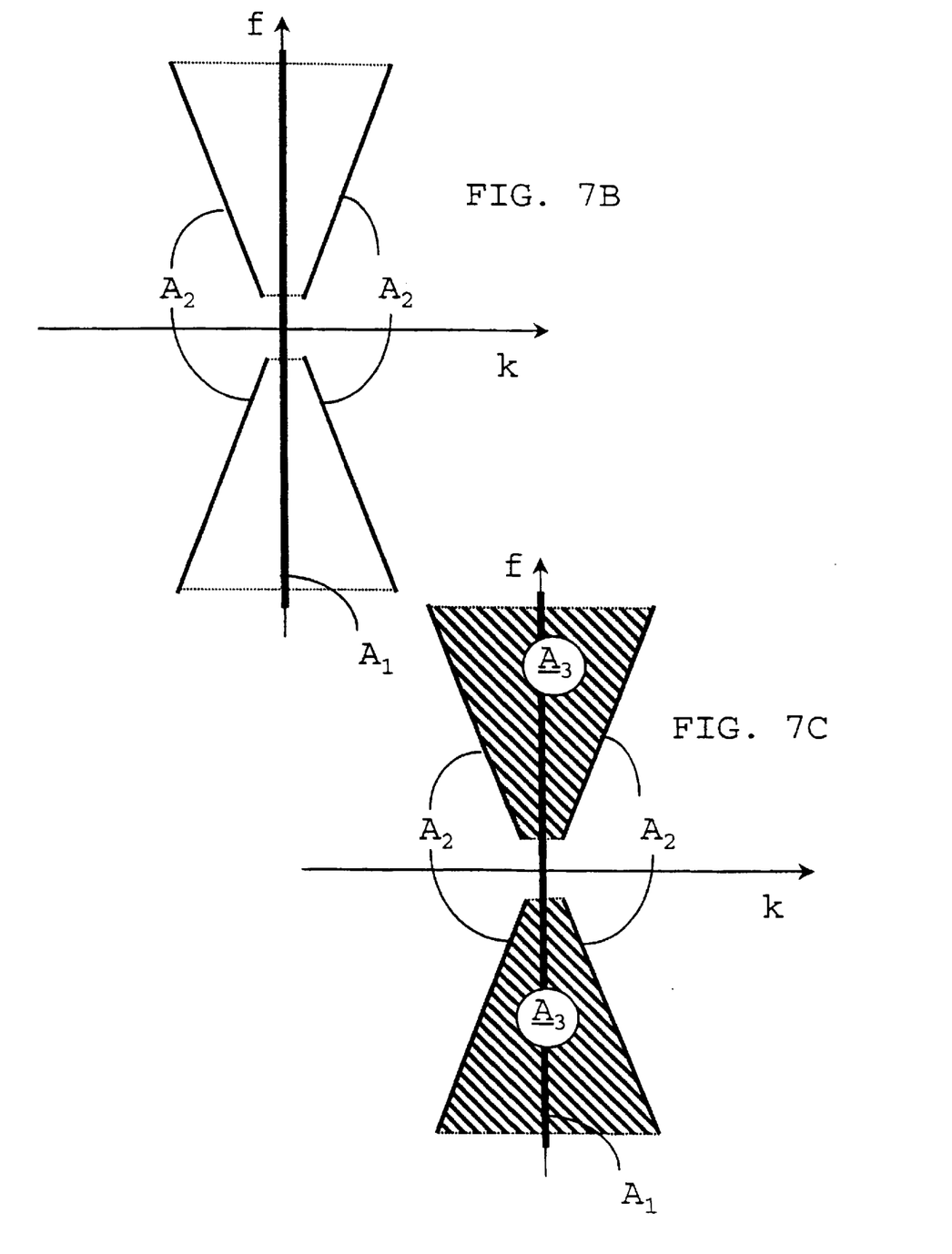

Methods of pursuing this approach are shown in FIGS. 7A–C, where A is the region as shown in FIG. 3. In the following examples, this region A is partioned into sections A1 and A2 as illustrated in FIGS. 7A and 7B.

It can be shown that if A1 is the k=0 line in the f-k space, then the space of projected steering vectors over A1 can be spanned by L-1 eigenvectors of $R_{A1}^-$ (see eq. [42] below), as long as the quiescent response $w_g$ has unity response over A1, as usually is the case. That is, the matrix $$\tilde{R}_{A1} \equiv \int_{A1} df \tilde{d}(f, 0) \tilde{d}^H(f, 0). \quad [42]$$

has rank L-1. This is an interesting observation, as it neatly ties the single look-direction constraints and the generalized constraints. If the signal protection region A is chosen as A1, the quiescent response $w_q$ is chosen as $$w_q = \begin{bmatrix} 1 \\ 1 \\ \vdots \\ 1 \end{bmatrix} \otimes \begin{bmatrix} 0 \\ \vdots \\ 1 \\ \overline{K} \\ \vdots \\ 0 \end{bmatrix}, \quad [43]$$

and the columns of matrix D in the constraint matrix C are chosen as the L-1 eigenvectors of $R_{A1}^-$ corresponding to the non-zero eigenvalues, then the linear constraints set by the two methods become identical. Having above defined the region A1 as the k axis, there are various possibilities for defining A2. One would be to define A2 as the rest of the region A as in FIG. 7A. Another way to define A2 is shown in FIG. 7B. In this case A2 is basically the boundary of the original region A.

In general, if the number of array elements K is small and the original region A has a relatively short wavenumber extent, setting the additional constraints as in FIG. 7B would be preferred. When the number of sensor elements is small, the variability of the beamformer response as a function of wavenumber is limited, and constraining the response more strictly at a few points for each frequency may be more effective than constraining it over all the points of a wide region. If the number of array elements is large or the region A is wide in wavenumbers, defining A2 as in FIG. 7A would be preferred. It is of course possible to generalize even further to combine the two types of additional constraints as shown in FIG. 7C giving rise to three sections denoted A1, A2 and A3 of region A.

When the protection region A is partitioned using any of the approaches above, the constraints can be computed defining the response vector as in eq. [38], where 0 has appropriate length, and the constraint matrix C is given as $$C = [w_{qd}/\|w_{qd}\|^2, D_{A1}, D_{A2}] \qquad [44]$$

Here, $D_{A1}$ is the matrix whose columns are the L−1 principal eigenvectors of $R_{A1}^-$ (cf. eq.[42])

$$\tilde{R}_{A1} = (I - P_{w_{qd}}) R_{A1} (I - P_{w_{qd}}) \qquad [45]$$

using the projection matrix with respect to $w_{qd}$ defined in eqs. [27], [28]. $D_{A2}$ is the matrix whose columns are the principal eigenvectors of $R_{A2}^-$:

$$\tilde{R}_{A2} = (I - P_{C_{A1}}) R_{A2} (I - P_{C_{A1}}) = (I - P_{D_{A1}})(I - P_{w_{qd}}) R_{A2} (I - P_{w_{qd}}) (I - P_{D_{A1}}) \qquad [46]$$

where $$C_{A1} = [w_{qd}/\|w_{qd}\|^2, D_{A1}], \qquad [47]$$

$$P_{C_{A1}} = C_{A1}(C_{A1}^T C_{A1})^{-1} C_{A1}^T \qquad [48]$$

$$P_{D_{A1}} = D_{A1}(D_{A1}^T D_{A1})^{-1} D_{A1}^T, \text{ and} \qquad [49]$$

$$R_{A2} = \iint_{A2} dfdk d(f, k) d^H(f, k). \qquad [50]$$

Equation [146] shows two alternative ways of computing $R_{A1}^-$. These equations have been written for partitioning of A into two subregions, but can be generalized to more sub-regions.

By partitioning the original signal protection region A as described, choosing A1 as the k=0 line, setting the quiescent response $w_q$ as in [43], and constructing the columns of matrix D in the constraint matrix C are chosen as the L−1 eigenvectors of $R_{A1}^-$ corresponding to the nonzero eigenvalues, any additional sub-regions A2, A3, etc. would give additional control over beamformer response with respect to the look-direction constraints.

For some applications, it may be useful to reduce the degrees of freedom used by the adaptive beamformer. In the so-called partially adaptive beamformer, only a portion of the available degrees of freedom are used adaptively. The main advantages of reducing the adaptive degrees of freedom are reduced computational cost and improved adaptive convergence rate. The primary disadvantage of partially adaptive beamforming is a degradation in the steady state interference cancellation capability of the beamformer. Therefore, the objective of partially adaptive beamformer design is to reduce the number of adaptive weights without significantly degrading the performance of the adaptive array.

Previous partially adaptive methods includes numerical techniques for approximately minimizing the average generalized sidelobe canceller (GSC) output power for a desired number of adaptive weights, where the average is over a range of jammer parameters. The present invention uses a method which is based on a design method described by H. Yang and M. A. Ingram, IEEE Trans. On Antennas and Propagation, Vol. 45, 843–850, May 1997. It also attempts to minimize the average GSC output power, but under a constraint that the reduced-dimensional solutions for all of the scenario trials lie in the same subspace. This constraint makes it possible to use a singular value decomposition to get the rank-reducing transformation, thereby simplifying the optimization problem.

The generalized sidelobe canceller solution can be written as (cf. [18]):

$$w_i^* = w_q - B w_{ai}, \qquad [51]$$

where B is a KL×(KL−Q) full rank matrix whose columns span the orthogonal subspace of the constraints matrix C and is known as the blocking matrix. The vector $w_{ai}$ is the KL×Q dimensional adaptive part of the optimal weight vector and is given by $$w_{ai} = (B^T \Phi_i B)^{-1} B^T \Phi_i w_q. \qquad [52]$$

The partially adaptive GSC achieves a smaller number W of adaptive weights, through the use of a (KL−Q)×W linear transformation T following B prior to adaptive weighting. The partially adaptive optimal weight vector can be expressed as $$w_i^* = w_q - BT w_{pi}, \qquad [53]$$

where the W-dimensional adaptive part of the optimal weight is $$w_{pi} = (T^T B^T \Phi_i BT)^{-1} T^T B^T \Phi_i w_q. \qquad [54]$$

It is now the aim to choose T which minimizes the interference and noise output power over a set of likely interference scenarios. These scenarios can be characterized by different parameters like the number of interferers, interferer directions, interferer spectral densities, white noise levels, etc. The applied method can be summarized as follows:

for each random outcome $\theta_j$ from a distribution of scenario parameters, compute the full-rank optimal adaptive weight vector $w_{ai}$ from [52] and the transformed weight vector α given by $$\alpha(\theta_j) = U\Sigma U^T w_{ai}(\theta_j), \qquad [55]$$

where $$B^T \Phi_i(\theta_j) B = U\Sigma^2 U^T \qquad [56]$$

is the eigendecomposition of $\Phi_i^-(\theta j)$;

store vectors $w_{ai}(\theta_j)$ and $\alpha(\theta_j)$ into the matrices W and A, respectively;

compute the singular value decomposition of A to get $U_A$ from $$A = U_A \Sigma_A V_A^H; \qquad [57]$$

and derive T as the first W columns of $WA^\# U_A$, where the superscript "#" indicates the pseudoinverse.

In most seismic surveys, the noise such as ground roll or swell noise occupies only a fraction of the temporal bandwidth available. For example in a land seismic survey, the Nyquist frequency is 250 Hz, while most of the ground roll energy is under 30 Hz. Concentrating filtering efforts to the frequency band where the noise resides is desirable to reduce computational cost.

One means of achieving this aim involves adding QMF (quadrature mirror filter) perfect reconstruction filter banks, described for example by P. P. Vaidyanathan, in "Multirate Systems and Filter Banks, Prentice Hall, 1993 or by M. J. T. Smith and T. P. Barnwell III, in: IEEE Trans. Acoust. Speech Signal Processing, Vol. ASSP-34, 434–441 (1986) to the seismic noise and interference suppression system using adaptive multichannel filter banks, as described above. Two filter banks are used in this system. The QMF filter bank is used to decompose the traces into frequency bands and decimate before adaptive filtering is applied, and is subsequently used for resynthesizing the original signal. The multichannel adaptive filter bank is the heart of the system performing the actual filtering for noise suppression. Using the perfect reconstruction filter banks to decimate reduces the number of points to be processed and also allows reduction in the number of coefficients in the adaptive filters, bringing in significant savings in CPU time and memory requirements.

What is claimed is:

1. Method for filtering noise from discrete noisy seismic signals, said method comprising the steps of:
   receiving signals representing seismic energy reflected and/or refracted from an earth structure using a plurality of seismic receivers; and
   filtering received signals using an at least partially adaptive filter that attenuates signals that lack predetermined propagation characteristics; said filtering step comprising the steps of:
      defining at least two independent sets of conditions with a first set defining a desired response, and a second set, defining the propagation characteristics of signals to be preserved wherein the first set is not affected by the second set; and
      adapting filter coefficients of said filter subject to said at least two independent sets of conditions so as to optimize the filter output for signals that lack the propagation characteristics of signals to be preserved.

2. The method of claim 1 wherein the step of adapting comprises optimizing a cost function representing the output power of the filter and the white noise gain of the filter.

3. The method of claim 2 wherein the cost function represents a weighted sum of the output power of the filter and the white noise gain of the filter.

4. The method of claim 3 wherein the relative weight of the output power and the "white noise gain" in the cost function is adjustable.

5. The method of claim 1 wherein the propagation characteristics of a signal is determined by its temporal and spatial spectral content.

6. The method of claim 1 wherein the propagation characteristics of a signal is determined by its wavenumber and frequency.

7. The method of claim 1 wherein the propagation characteristics of a signal is defined as a region or as regions in the frequency-wavenumber domain.

8. The method of claim 1 wherein the propagation characteristics of a signal includes a plurality directions in the frequency-wavenumber domain.

9. The method of claim 1 wherein the conditions define a constraint matrix comprising at least two mutually orthogonal subspaces with a first subspace defining the desired response of the filter and a second subspace defining the propagation characteristics of the signals to be preserved with said matrix being applied during the adaptation process of filter coefficients.

10. The method of claim 1 wherein the conditions define a constraint matrix using a quiescent response vector and principle eigenvectors of a correlation matrix made of steering vectors defining at least one region of the frequency-wavenumber domain wherein the signals are preserved.

11. The method of claim 1 wherein the conditions are defined such that signals with pre-determined propagation characteristics are suppressed by the filter.

12. The method of claim 1, wherein said filtering step further comprises defining further sets of conditions with one set of conditions forcing the desired response of the filter to zero and one set of conditions defining the propagation characteristics of signals to be suppressed by the filter.

13. The method of claim 1 wherein the filter comprises M temporally local filters, said filters forming a filter bank, and M being a number equal to or larger than two.

14. The method of claim 13 including the step of multiplying M filtered estimates with temporal window functions.

15. The method of claim 14 wherein the temporal window functions are characterized by the requirement that only adjoining windows overlap.

16. The method of claim 14 wherein the cost function is minimized using the approximation that the sum, weighted by window functions, of the output of adjacent filters of the M filters is equal when applied to the same signal in time regions where said window functions overlap.

17. The method of claim 1 comprising the further step of dividing filter coefficients into a fixed part and a adaptive part.

18. The method of claim 1 comprising the further step of splitting the signals into at least two frequency bands, filtering at least one of said at least two frequency band, and, before further processing, recombining said frequency bands to regain noise attenuated seismic signals.

19. The method of claim 1 wherein the discrete noisy signals used as input are recordings from individual seismic sensors prior to any group forming techniques.

20. The method of claim 1 comprising the further steps of positioning at least one seismic source and a plurality of seismic receivers at appropriate positions in a land, marine or transitional zone environment; activating said at least one source to propagate energy through subterranean formations, and using said receivers to measure energy as single sensor recordings, converting said single sensor recordings into discrete seismic signals; and transmitting said signals as input to the filter.

21. A method for filtering noise from discrete noisy seismic signals, said method comprising the steps of:
   receiving signals representing seismic energy reflected and/or refracted from an earth
   structure using a plurality of seismic receivers; and
   filtering received signals using an at least partially adaptive filter that attenuates signals that lack certain propagation characteristics; said filtering step comprising the steps of:
      defining conditions with a first set defining a desired response, and a second set defining propagation characteristics of signals to be preserved; and
      adapting filter coefficients of said filter subject to said sets of conditions so as to optimize the filter output for signals that lack the propagation characteristics of signals to be preserved at least in party by optimizing a cost function representing the output power of the filter and the white noise gain of the filter.

22. The method of claim 21 wherein the cost function represents a weighted sum of the output power of the filter and the white noise gain of the filter.

23. The method of claim 22 wherein the relative weight of the output power and the "white noise gain" in the cost function is adjustable.

* * * * *